(12) United States Patent
Miwa

(10) Patent No.: US 7,297,175 B2
(45) Date of Patent: Nov. 20, 2007

(54) EXHAUST GAS PURIFYING FILTER

(75) Inventor: Shinichi Miwa, Tajimi (JP)

(73) Assignee: NGK Insulators, Ltd., Nagoya (JP)

( * ) Notice: Subject to any disclaimer, the term of this patent is extended or adjusted under 35 U.S.C. 154(b) by 305 days.

(21) Appl. No.: 10/506,083

(22) PCT Filed: Feb. 13, 2003

(86) PCT No.: PCT/JP03/01503

§ 371 (c)(1),
(2), (4) Date: Aug. 31, 2004

(87) PCT Pub. No.: WO03/076773

PCT Pub. Date: Sep. 18, 2003

(65) Prior Publication Data

US 2005/0120691 A1    Jun. 9, 2005

(30) Foreign Application Priority Data

Mar. 13, 2002  (JP)  .............................. 2002-068579

(51) Int. Cl.
*B01D 46/00* (2006.01)
(52) U.S. Cl. .................................. 55/523; 55/DIG. 30
(58) Field of Classification Search .................. 55/523; 428/116; 422/177
See application file for complete search history.

(56) References Cited

U.S. PATENT DOCUMENTS

| | | | |
|---|---|---|---|
| 4,519,820 A | | 5/1985 | Oyobe et al. |
| 4,568,402 A | * | 2/1986 | Ogawa et al. ............ 156/89.22 |
| 4,617,289 A | * | 10/1986 | Saito et al. ................. 502/339 |
| 5,595,581 A | * | 1/1997 | Ichikawa et al. ............. 55/302 |
| 5,629,067 A | * | 5/1997 | Kotani et al. ................ 428/116 |
| 5,720,787 A | * | 2/1998 | Kasai et al. ................... 55/282 |
| 5,750,026 A | * | 5/1998 | Gadkaree et al. ........ 210/502.1 |
| 5,863,508 A | * | 1/1999 | Lachman et al. ........... 422/171 |
| 5,914,187 A | * | 6/1999 | Naruse et al. .............. 428/327 |

FOREIGN PATENT DOCUMENTS

| | | |
|---|---|---|
| EP | 0 737 801 A1 | 10/1996 |
| JP | U 61-10917 | 1/1986 |
| JP | U 2-63020 | 5/1990 |
| JP | U 2-112919 | 9/1990 |
| JP | A 4-243524 | 8/1992 |
| JP | A 6-210117 | 2/1994 |
| JP | 06-21117 * | 8/1994 |
| JP | A 10-99624 | 4/1998 |
| JP | 2001-096115 * | 4/2001 |
| JP | A 2001-96115 | 10/2001 |
| JP | 2002-336620 A | 11/2002 |
| JP | 2002-248311 A | 9/2003 |

* cited by examiner

*Primary Examiner*—Duane Smith
*Assistant Examiner*—Sonji Turner
(74) *Attorney, Agent, or Firm*—Oliff & Berridge, PLC

(57) ABSTRACT

There is disclosed an exhaust gas purifying filter of the present invention comprising a honeycomb structure formed of a porous ceramic material and including: a large number of through-holes 3; plugged portions 10 formed in one end portion of each of predetermined through-holes 3 and in the other end portion of each of remaining through-holes 3; and partition walls 2 partitioning the through-holes 3 and formed into filter layers, characterized in that a plugging length is non-uniform for each plugged portion 10, and the filter has characteristics such as high porosity and thin wall while hardly causing defects such as chipping and falling-off of the plugged portions during packing, transporting, and handling.

8 Claims, 4 Drawing Sheets

EXHAUST GAS PURIFYING FILTER

TECHNICAL FIELD

The present invention relates to an exhaust gas purifying filter for use in removing solid particulates in an exhaust gas, which is represented by a diesel particulate filter.

BACKGROUND ART

To remove solid particulates containing carbon as a main component from a combustion exhaust gas exhausted, for example, from a diesel engine, a filter for purifying an exhaust gas (hereinafter referred to simply as the "filter") has heretofore been used in which one-end portions of predetermined through-holes of a honeycomb structure formed of a porous ceramic material and including a large number of through-holes are plugged, the other end portions of the remaining through-holes are plugged, and partition walls partitioning the through-holes are formed as filter layers.

FIG. 6 is a schematic diagram showing a plugged state of a filter end surface. Plugged portions 10 constituted by charging a plugging material into end portions on opposite sides in adjacent through-holes (cells) 3 (shown in FIG. 5) are alternately formed to close the through-holes (cells) 3 in such a manner that the end surface of the filter has a checkered pattern in the shown state. FIG. 5 is a schematic diagram showing a plugging structure of a conventional filter for purifying the exhaust gas. The plugged portions 10 are formed in the one-end portions of the through-holes (cells) 3 and the other end portions of the remaining through-holes (cells) 3, and accordingly partition walls 2 partitioning the through-holes (cells) 3 bear functions of filter layers.

In recent years, resulting from technical progress of the diesel engine, especially high pressure injection of fuel, miniaturization of solid particles exhausted from the diesel engine has advanced, and there has been an increasing expectation for development of a diesel particulate filter (DPF) for use in capturing such fine solid particulates.

Moreover, there has been a growing interest in an environmental problem, restrictions on the exhaust gas have also became tighter, and a filter which is capable of more effectively capturing the solid particulates and which has characteristics such as high porosity and thin wall has been developed at fever pitch.

Although the increasing of the porosity of the partition wall and the thinning of the wall are realized, there is a tendency that strength of the partition wall decreases, and therefore a problem easily occurs that defects such as chipping and cracking are easily caused also by a slight impact load. Therefore, careful attentions need to be paid during not only packing and transporting of products but also canning process and handling of the products.

Especially, boundaries between the plugged portions 10 into which the plugging material is charged and the through-holes (cells) 3 into which the plugging material is not charged in FIG. 5 are sometimes cracked, and accordingly the defects such as chipping and falling-off of the plugged portions are generated in many cases. This is supposed to be a phenomenon resulting from a difference in strength between the plugged portions 10 and the through-holes (cells) 3, but this problem has become tangible with the increasing of the porosity of the partition wall 2 and the thinning of the wall, and there has been a demand for a concrete countermeasure.

The present invention has been developed in consideration of the problems of the related arts, and an object thereof is to provide an exhaust gas purifying filter which has characteristics such as high porosity and thin wall but which hardly causes defects such as chipping and falling-off of plugged portions during packing, transporting, or handling.

DISCLOSURE OF THE INVENTION

That is, according to the present invention, there is provided an exhaust gas purifying filter comprising a honeycomb structure formed of a porous ceramic material and including: a large number of through-holes; plugged portions formed in one end portion of each of predetermined through-holes and in the other end portion of each of remaining through-holes; and partition walls partitioning the through-holes and formed into filter layers, characterized in that a plugging length is non-uniform for each plugged portion.

On the other hand, according to the present invention, there is provided an exhaust gas purifying filter comprising a honeycomb structure formed of a porous ceramic material and including: a large number of through-holes; plugged portions formed in one end portion of each of predetermined through-holes and in the other end portion of each of remaining through-holes; and partition walls partitioning the through-holes and formed into filter layers, characterized in that a plugging length in a central portion of the plugged portion is formed to gradually shorten as compared with that in an outer peripheral portion of the plugged portion.

In the present invention, the plugging length of the through-hole in a central part of the exhaust gas purifying filter is preferably formed to gradually shorten as compared with that of the through-hole in an outer peripheral part of the exhaust gas purifying filter.

The above-described honeycomb structure of the present invention is preferably formed of at least one material selected from the group consisting of cordierite, zirconium phosphate, aluminum titanate, lithium aluminum silicate (LAS), and silicon carbide.

Moreover, in the present invention, a catalyst is preferably supported, and the catalyst preferably contains at least one type selected from the group consisting of Pt, Pd, Rh, K, Ba, Li, and Na.

BEST MODE FOR CARRYING OUT THE INVENTION

Embodiments of the present invention will be described hereinafter, but it should be understood that the present invention is not limited to the following embodiments and that modifications, improvements and the like of designs are appropriately added without departing from the scope of the present invention based on ordinary knowledge of a person skilled in the art.

Figure 5:
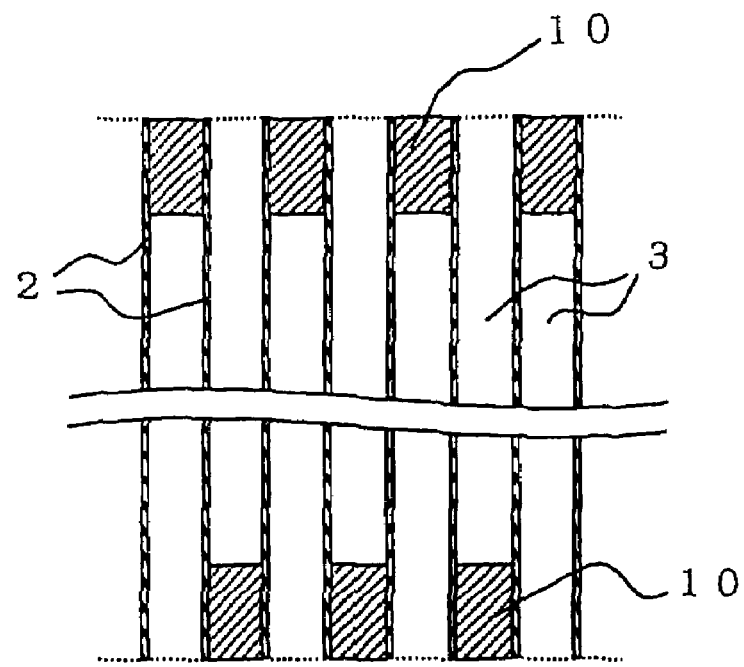
FIG. 5 is a schematic diagram showing a plugged structure of a conventional filter for purifying the exhaust gas.
Figure 6:
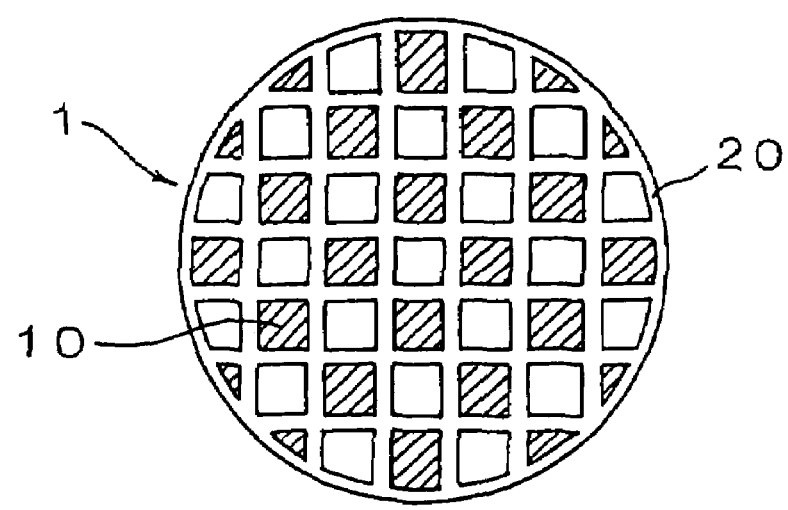
FIG. 6 is a schematic diagram showing a plugged state of a filter end surface.

In a filter for purifying an exhaust gas in the present invention, one end portion of each of predetermined through-holes of a honeycomb structure formed of a porous ceramic material and including a large number of through-holes is plugged, the other end portion of each of remaining through-holes is plugged, and partition walls partitioning the through-holes are formed as filter layers. In the plugging, in the same manner as in a conventional known diesel particulate filter, as shown in FIG. 6, a plugging material is charged into end portions on opposite sides in adjacent through-holes (cells) 3 (shown in FIG. 5) to alternately form plugged portions 10 in such a manner that an end surface of the filter has a checkered pattern, and the through-holes (cells) 3 are preferably closed.

When the exhaust gas is passed from one end surface of the filter, the exhaust gas containing solid particulates flows into the filter from through-holes whose end portions on this end surface side are not plugged, passes through porous partition walls, and enters the other through-holes whose end portions on the other end surface side of the filter are not plugged. Moreover, the solid particulates in the exhaust gas are captured by the partition walls during the passing through the partition walls, and the purified exhaust gas from which the solid particulates have been removed is exhausted from the other end surface of the filter.

Figure 1:
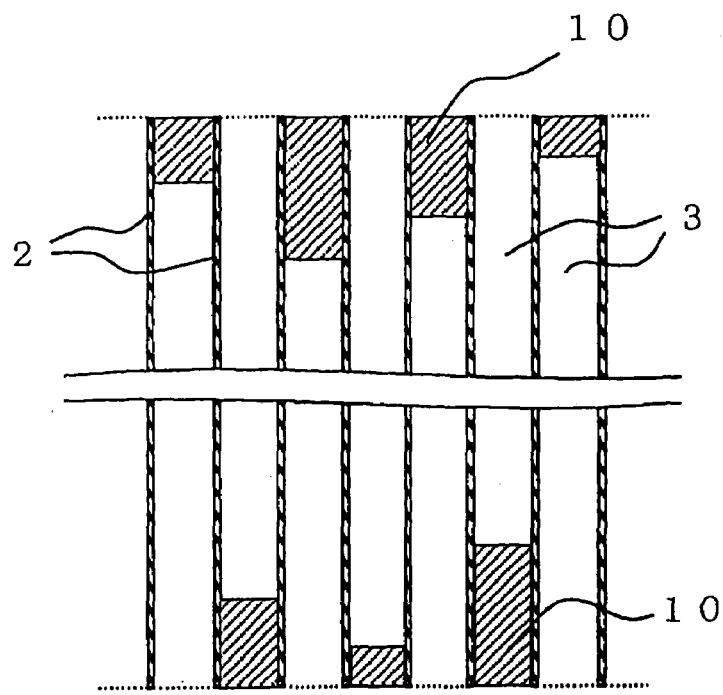
FIG. 1 is a schematic diagram showing one embodiment of a filter for purifying an exhaust gas according to the present invention.

FIG. 1 is a schematic diagram showing one embodiment of the filter for purifying the exhaust gas according to the present invention, and shows a state in which the plugged portions 10 are formed in one end portion of the through-hole (cell) 3 and the other end portion of the remaining through-hole (cell) 3. In this manner, the filter of the present embodiment is characterized in that a plugging length of each plugged portion 10 becomes non-uniform. That is, a boundary between the plugged portion 10 in which the plugging material is charged and the through-hole (cell) 3 in which the plugging material is not charged is non-uniform for each through-hole (cell). Therefore, the boundary is not easily cracked, and accordingly an effect is produced that defects such as chipping and falling-off of the plugged portion are not easily generated.

Next, another embodiment of the filter according to the present invention will be described. The filter of the present invention is characterized in that a plugging length in a central portion of the plugged portion is formed to gradually shorten as compared with that in an outer peripheral portion of the plugged portion.

Figure 3:
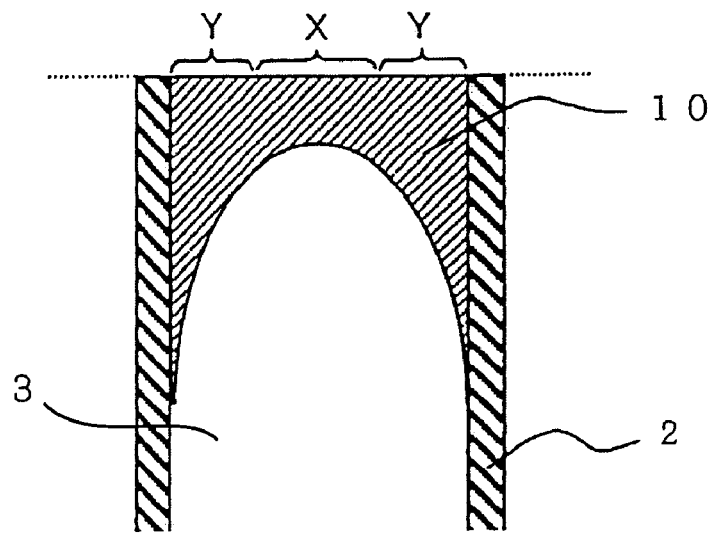
FIG. 3 is a schematic diagram showing one embodiment of a structure of a plugged portion of the filter for purifying the exhaust gas according to the present invention.

FIG. 3 is a schematic diagram showing one embodiment of a structure of the plugged portion of the filter for purifying the exhaust gas according to the present invention, and shows a state in which a plugging length in a central portion X of the plugged portion is formed to gradually shorten as compared with that in an outer peripheral portion Y of the same plugged portion in one end portion of the through-hole (cell) 3.

It is to be noted that the "outer peripheral portion" of the plugged portion mentioned here means a portion abutting on the partition wall constituting the through-hole and its vicinity in a case where the end surface of the filter is observed in parallel with the through-hole. The "central portion" of the plugged portion means a portion in the vicinity of a middle of the through-hole and inside the above-described "outer peripheral portion".

In this manner, the filter of the present embodiment is constituted in such a manner that strength of the filter gradually changes in the boundary between the plugged portion 10 in which the plugging material is charged and the through-hole (cell) 3 in which the plugging material is not charged. Therefore, the boundary is not easily cracked, and accordingly an effect is produced that the defects such as the chipping and falling-off of the plugged portion are not easily generated.

Figure 4:
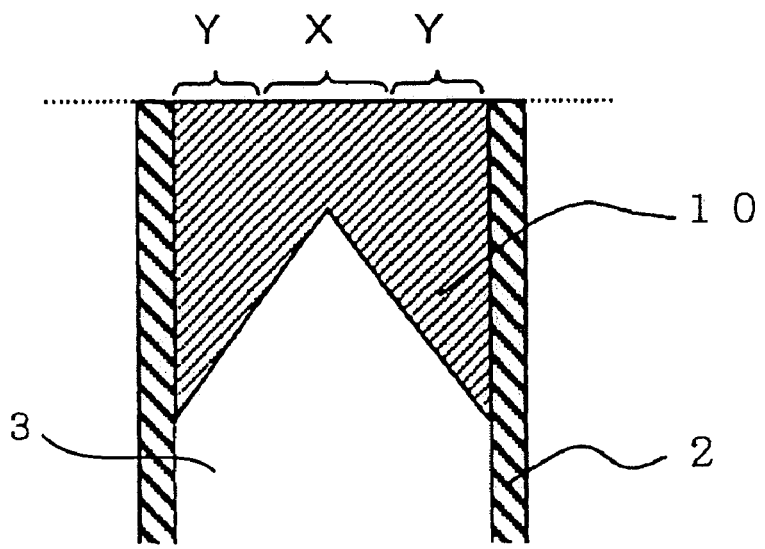
FIG. 4 is a schematic diagram showing another embodiment of the structure of the plugged portion of the filter for purifying the exhaust gas according to the present invention.

FIG. 4 is a schematic diagram showing another embodiment of the structure of the plugged portion of the filter for purifying the exhaust gas according to the present invention. In one end portion of the through-hole (cell) 3, the plugging length in the central portion X of the plugged portion is formed to gradually shorten as compared with that in the outer peripheral portion Y of the same plugged portion, and a portion in which the plugging material is not charged is formed into a pyramid shape in this example. Even when the shape of the plugged portion is changed in this manner, needless to say, an equivalent effect is produced that the defects such as the chipping and falling-off of the plugged portion are not easily generated.

Figure 2:
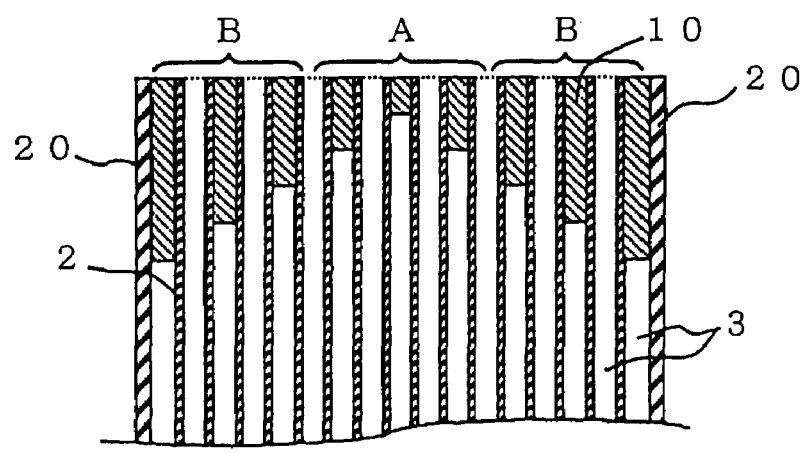
FIG. 2 is a schematic diagram showing another embodiment of the filter for purifying the exhaust gas according to the present invention.

FIG. 2 is a schematic diagram showing another embodiment of the filter for purifying the exhaust gas according to the present invention, and shows a state in which the plugged portions 10 are formed in one-end portions of the through-holes (cells) 3 and the other end portions of the remaining through-holes (cells) 3 in the same manner as in FIG. 1. However, in the present embodiment, the plugging lengths of the through-holes 3 in a central part A of the honeycomb structure is preferably formed to gradually shorten as compared with those of the through-holes 3 in an outer peripheral part B of the honeycomb structure. That is, even in this embodiment, the boundary between the plugged portion 10 in which the plugging material is charged and the through-hole (cell) 3 in which the plugging material is not charged becomes non-uniform for each through-hole (cell), therefore the boundary is not easily cracked, and accordingly the effect is produced that the defects such as the chipping and falling-off of the plugged portion are not easily generated.

It is to be noted that the "outer peripheral part" of the honeycomb structure mentioned in the present invention means the vicinity of each outer peripheral wall 20 of the honeycomb structure (exhaust gas purifying filter 1) in a case where the end surface of the honeycomb structure (exhaust gas purifying filter 1) is observed in parallel with the through-hole shown in FIG. 6. The "central part" of the honeycomb structure is a part inside the above-described "outer peripheral part".

When the exhaust gas of a diesel engine is passed from one end surface of the filter, the exhaust gas flows into the filter from holes whose end portions on this end surface side are not plugged, passes through porous partition walls, and enters the other holes whose end portions on the other end surface side of the structure are not plugged. Moreover, the solid particulates in the exhaust gas are captured by the partition walls during the passing through the partition walls, and the purified exhaust gas from which the solid particulates have been removed is exhausted from the other end surface of the filter.

It is to be noted that when the captured solid particulates are accumulated on the partition walls, the filter is clogged, its function is deteriorated, the filter is periodically heated by heating means such as a heater to burn/remove the solid particulates, and the filter function is regenerated. However, to promote the burning of the solid particulates at this regeneration time, the filter may support a catalyst. The catalyst is preferably a catalyst containing at least one type selected from the group consisting of Pt, Pd, Rh, K, Ba, Li, and Na from a viewpoint of efficient regeneration of the filter function.

Moreover, in the filter including the honeycomb structure whose cells are plugged in a checked pattern as in the present invention, both a cell opened on an inflow side and a cell opened on an exhaust side may also be coated with ceramic particle layers. However, since the solid particulates in the exhaust gas are accumulated on the former cell, only the former cell is preferably coated from a viewpoint of minimization of a pressure loss rise by the coating.

A material constituting the honeycomb structure forming a main body of the filter of the present invention is preferably at least one material selected from the group consisting of cordierite, zirconium phosphate, aluminum titanate, LAS, and silicon carbide. Cordierite, zirconium phosphate, aluminum titanate, and LAS have small coefficients of thermal expansion. Therefore, when one material selected from the group consisting of them, or a compound material mixed with two or more of these materials is used as the material constituting the honeycomb structure, a filter superior in thermal shock resistance is obtained. When zirconium phosphate, aluminum titanate, and silicon carbide are used as the materials constituting the honeycomb structure, a filter superior in heat resistance is obtained because their melting points are high. When the plugging material for use in plugging the through-hole (cell) of the honeycomb structure matches the material constituting the honeycomb structure, both coefficients of thermal expansion preferably match each other.

It is to be noted that the filter according to the present invention hardly causes the defects such as the chipping and falling-off of the plugged portion during packing, transporting, and handling as compared with the filter including a conventional structure of the plugged portion. Therefore, an effect is also produced that cost required for maintenance after manufacturing the filter is reduced.

Next, details of the filter of the present invention will be described in accordance with an example of a method of manufacturing the filter.

A basic structure of the filter including the honeycomb structure is formed by an extrusion molding method. The basic structure mentioned herein refers to a cell structure, that is, rib thickness, cell density, diameter, and length, and they are formed at the time of the extrusion molding; In general, in consideration of a ratio of a dimension at the molding time to that after calcining, the molding may be performed in such a manner that a desired dimension can be achieved after the calcining.

After heating/drying a honeycomb structure formed article obtained in this manner on appropriate conditions, plugging is performed in order to impart the filter function. It is to be noted that there are a case where the plugging is performed after the forming/heating and another case where the plugging is performed after the calcining, but either case may be used.

Next, an example of a general method of charging the plugging material will be described. A thin film opened in a checkered pattern is attached to the end surface of the honeycomb structure, the structure is immersed into a slurry plugging material from the end surface, and slurry is allowed to enter the through-holes of honeycomb corresponding to film openings to charge the plugging material. The plugging lengths may be controlled by a depth of the honeycomb structure immersed into the slurry.

To charge the plugging material in uniform lengths with respect to all the through-holes, as described above, the film may be attached and the structure may be immersed into the slurry once. However, to obtain the filter including the structure represented by FIGS. 1, 2 according to the present invention, the immersing operation may be performed twice or more. That is, to perform the immersing twice or more, for example, a thin film including two or more opening patterns of the central part and outer peripheral part of the end surface of the honeycomb structure is prepared, and a filter including a honeycomb structure having a distribution of the plugging lengths can be obtained, when this film is used, and the immersing depth is changed.

As another method, the central portion of an area of the film opening is reduced, and the peripheral portion thereof is enlarged to control an amount of slurry which flows into the through-hole. Even by this method, the filter including the honeycomb structure having the distribution of plugging lengths can be obtained.

Moreover, to obtain the plugged portion structures shown in FIGS. 3, 4, a rubber film opened in a checkered pattern is attached to the end surface of the honeycomb structure, and the slurry plugging material may be poured from the end surface. In this case, when an opening area of the rubber film is changed, the amount of slurry flowing into each cell can be adjusted, and accordingly the plugged portion structure can be formed as shown in FIGS. 3, 4.

The present invention will be described hereinafter in more detail based on examples, but the present invention is not limited to these examples.

EXAMPLES 1 TO 10

Clay was prepared by a conventional known method, and a honeycomb structure was formed having a diameter of 145 mm, length of 152 mm, wall thickness of 0.31 mm, and cell density of 300 cells/square inch by an extrusion molding method. Next, after drying an obtained molded article, a plurality of thin films having different opening patterns were used, end portions of through-holes were sealed with a plugging material identical to the material of a main body in order to achieve a plugging length distribution shown in Table 1, and this article was calcined at 1400° C. to prepare a filter including a honeycomb structure formed of cordierite. It is to be noted that the "plugging length (mm) in Table 1 means a plugging length in each part, assuming that a middle part is (A), a position of 24 mm from the middle part is (B), a position of 48 mm from the middle part is (C), and an outermost peripheral part is (D), when the end surface of the filter is observed in parallel with the through-hole. It is to be noted that in Table 1, porosity (%) and average pore diameter (μm) of the filter indicate values measured by a mercury porosimetry.

EXAMPLES 11 TO 13

Filters including honeycomb structures formed of zirconium phosphate, aluminum titanate, and LAS were prepared in procedures similar to those of Examples 1 to 10 described above.

EXAMPLES 14, 15

Filters including honeycomb structures formed of glass combined SiC were prepared in procedures similar to those of Examples 1 to 10 described above.

It is to be noted that a sintered body of an SiC material can be obtained by calcining, but a calcining temperature is generally high at 2000° C. or more. On the other hand, when a glass forming material is added to a pure SiC raw material and calcined, a glass softening temperature is low, the calcining at the low temperature is possible, and a micro structure of the obtained sintered body is a two-phase porous structure in which raw material SiC is partially combined in a glass phase. In the present example, 15% by mass of a cordierite raw material was added to SiC which was a raw material and used, and the filters including the honeycomb structures formed of glass combined SiC were prepared.

EXAMPLES 16, 17

Filters including honeycomb structures formed of cordierite were prepared by procedures similar to those of Examples 1 to 10 described above except that a plurality of rubber films including openings having small opening areas as compared with thin films and including different opening patterns were used instead of the plurality of thin films.

COMPARATIVE EXAMPLES 1 TO 5

Filters including honeycomb structures formed of cordierite were prepared by methods similar to those of Examples 1 to 10 except that the plugging length was set to be equal with respect to all through-holes.

COMPARATIVE EXAMPLES 6 TO 8

Filters including honeycomb structures formed of zirconium phosphate, aluminum titanate, and LAS were prepared by methods similar to those of Examples 11 to 13 except that the plugging length was set to be equal with respect to all through-holes.

COMPARATIVE EXAMPLES 9, 10

Filters including honeycomb structures formed of glass combined SiC were prepared by methods similar to those of Examples 14, 15 except that the plugging length was set to be equal with respect to all through-holes.

(Impact Strength Test)

Figure 7:
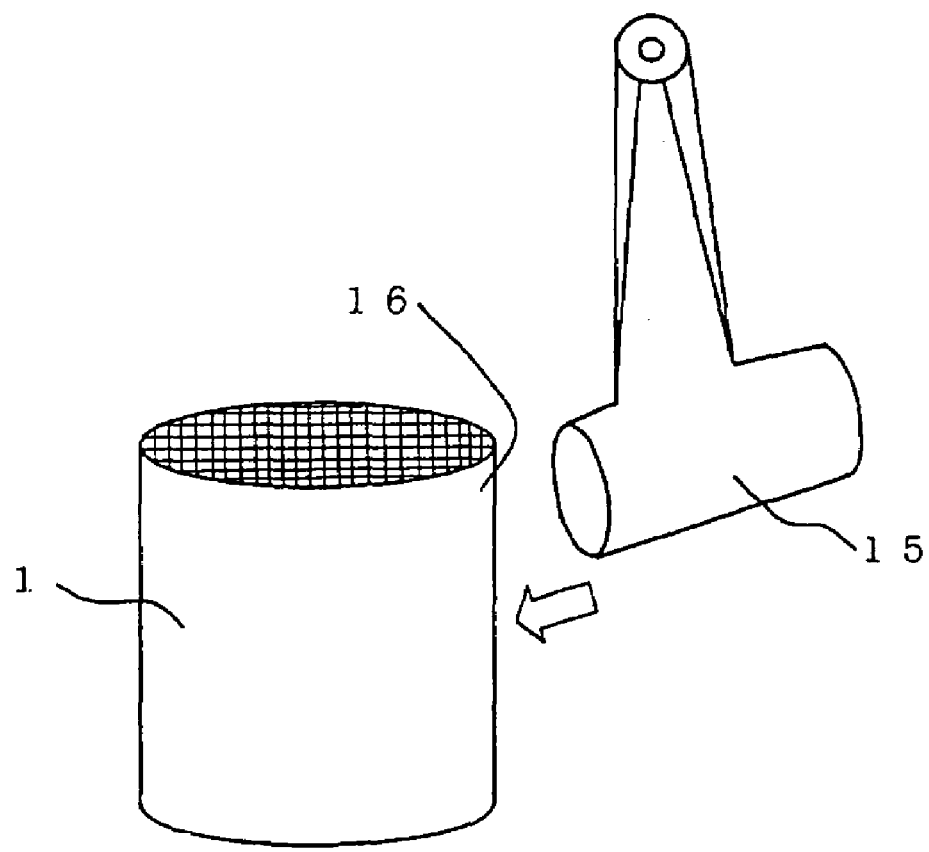
FIG. 7 is a schematic diagram showing a method of performing an impact strength test.

With respect to the respective filters of Examples 1 to 17 and Comparative Examples 1 to 10, as shown in FIG. 7, an impact was added to an end part 16 of a filter 1 in a side surface direction by use of a hammer 15 of a Charpy tester. The impacted filter was visually observed to evaluate a degree of wear and tear, that is, damage. Results are shown in Table 1. It is to be noted that as evaluation standards, "⊚" in a case where any damage was not generated, "○" in a case where the damage was little, "Δ" in a case where the damage was of a medium degree, and "x" in a case where the damage was remarkable were described in "evaluation of damage with respect to impact" in Table 1.

TABLE 1

| | Material | Porosity (%) | Average pore diameter (μm) | Plugging length (mm) | | | | Evaluation of damage with respect to impact |
|---|---|---|---|---|---|---|---|---|
| | | | | (A) | (B) | (C) | (D) | |
| Example 1 | Cordierite | 60 | 20 | 5 | 5 | 7.5 | 10 | ○ |
| Example 2 | Cordierite | 60 | 20 | 5 | 5 | 10 | 20 | ⊚ |
| Example 3 | Cordierite | 60 | 20 | 5 | 5 | 7.5 | 20 | ⊚ |
| Example 4 | Cordierite | 67 | 25 | 5 | 5 | 7.5 | 10 | ○ |
| Example 5 | Cordierite | 67 | 25 | 5 | 5 | 10 | 20 | ⊚ |
| Example 6 | Cordierite | 67 | 25 | 5 | 5 | 7.5 | 20 | ⊚~○ |
| Example 7 | Cordierite | 60 | 20 | 10 | 10 | 20 | 40 | ⊚ |
| Example 8 | Cordierite | 67 | 25 | 10 | 10 | 20 | 40 | ⊚ |
| Example 9 | Cordierite | 63 | 22 | 5 | 5 | 7.5 | 20 | ⊚ |
| Example 10 | Cordierite | 63 | 22 | 10 | 10 | 20 | 40 | ⊚ |
| Example 11 | Zirconium phosphate | 50 | 20 | 5 | 5 | 7.5 | 10 | ○ |
| Example 12 | Aluminum titanate | 45 | 20 | 5 | 5 | 10 | 20 | ⊚ |
| Example 13 | LAS | 45 | 20 | 5 | 5 | 7.5 | 20 | ⊚ |
| Example 14 | Glass combined SiC | 40 | 10 | 5 | 5 | 7.5 | 10 | ⊚ |
| Example 15 | Glass combined SiC | 45 | 15 | 5 | 5 | 10 | 20 | ⊚ |
| Example 16[*1] | Cordierite | 67 | 25 | 5 | 5 | 7.5 | 10 | ⊚~○ |
| Example 17[*2] | Cordierite | 67 | 25 | 5 | 5 | 7.5 | 10 | ⊚~○ |
| Comparative Example 1 | Cordierite | 54 | 15 | 5 | 5 | 5 | 5 | ○~Δ |
| Comparative Example 2 | Cordierite | 60 | 20 | 5 | 5 | 5 | 5 | Δ~X |
| Comparative Example 3 | Cordierite | 67 | 25 | 5 | 5 | 5 | 5 | X |
| Comparative Example 4 | Cordierite | 60 | 20 | 10 | 10 | 10 | 10 | Δ~X |
| Comparative Example 5 | Cordierite | 67 | 25 | 10 | 10 | 10 | 10 | Δ~X |

TABLE 1-continued

| | Material | Porosity (%) | Average pore diameter (μm) | Plugging length (mm) | | | | Evaluation of damage with respect to impact |
| --- | --- | --- | --- | --- | --- | --- | --- | --- |
| | | | | (A) | (B) | (C) | (D) | |
| Comparative Example 6 | Zirconium phosphate | 50 | 20 | 5 | 5 | 5 | 5 | Δ~X |
| Comparative Example 7 | Aluminum titanate | 45 | 20 | 5 | 5 | 5 | 5 | Δ |
| Comparative Example 8 | LAS | 45 | 20 | 5 | 5 | 5 | 5 | Δ~X |
| Comparative Example 9 | Glass combined SiC | 50 | 10 | 5 | 5 | 5 | 5 | Δ~X |
| Comparative Example 10 | Glass combined SiC | 45 | 15 | 5 | 5 | 5 | 5 | Δ |

*[1] A plugged portion has a shape shown in FIG. 3, and a ratio (x/y) of a plugging length (x) in a central portion X to a plugging length (y) in an outer peripheral portion Y is 0.5.
*[2] A plugged portion has a shape shown in FIG. 4, and a ratio (x/y) of a plugging length (x) in a central portion X to a plugging length (y) in an outer peripheral portion Y is 0.7.

As apparent from the results shown in Table 1, the filters of the examples according to the present invention had less damages on the end parts, that is, the plugged portions with respect to the impacts as compared with the filters of the comparative examples, and it was possible to confirm superiority of the present invention.

Moreover, even when the filters were prepared using zirconium phosphate, aluminum titanate, LAS, and glass combined SiC as the materials other than cordierite, it was possible to confirm that the filters had superior impact resistances.

INDUSTRIAL APPLICABILITY

As described above, according to an exhaust gas purifying filter of the present invention, since a plugged portion is formed into a predetermined structure, the filter has characteristics such as high porosity and thin wall, but produces an effect of hardly causing defects such as chipping and falling-off of the plugged portion during packing, transporting, and handling as compared with an exhaust gas purifying filter including a conventional plugged portion structure. Reduction of cost required for maintenance of the filter during the packing, transporting, and handling is also possible.

The invention claimed is:

1. An exhaust gas purifying filter, comprising:
   a honeycomb structure formed of a porous ceramic material having a first and second axial ends and defining a plurality of through-holes, a plurality of through-holes being sealed in one end portion with a plug to form a predetermined pattern of sealed through-holes at the first axial end, and the remaining through-holes being sealed in the second axial end portion with a plug; and
   partition walls partitioning the through-holes and formed into filter layers;
   wherein:
   the length of each plug is non-uniform; and
   the length of the plugs gradually shorten in a step-wise manner from an outer peripheral portion of an axial end of the filter to a central portion of the axial end.

2. An exhaust gas purifying filter, comprising:
   a honeycomb structure formed of a porous ceramic material having a first and second axial ends and defining a plurality of through-holes, a plurality of through-holes being sealed in one end portion with a plug to form a predetermined pattern of sealed through-holes at the first axial end, and the remaining through-holes being sealed in the second axial end portion with a plug; and
   partition walls partitioning the through-holes and formed into filter layers;
   wherein each plug is configured so that one end of the plug tapers in length inwardly so that a length of the plug at an outer diameter is longer than a length of the plug at an inner diameter; and
   the length of the plugs gradually shorten in a step-wise manner from an outer peripheral portion of an axial end of the filter to a central portion of the axial end.

3. The exhaust gas purifying filter according to claim 1, wherein the honeycomb structure is formed of at least one material selected from the group consisting of cordierite, zirconium phosphate, aluminum titanate, LAS, and silicon carbide.

4. The exhaust gas purifying filter according to claim 2, wherein the honeycomb structure is formed of at least one material selected from the group consisting of cordierite, zirconium phosphate, aluminum titanate, LAS, and silicon carbide.

5. The exhaust gas purifying filter according to claim 1, further comprising a catalyst.

6. The exhaust gas purifying filter according to claim 2, further comprising a catalyst.

7. The exhaust gas purifying filter according to claim 5, wherein the catalyst contains at least one element selected from the group consisting of Pt, Pd, Rh, K, Ba, Li, and Na.

8. The exhaust gas purifying filter according to claim 6, wherein the catalyst contains at least one element selected from the group consisting of Pt, Pd, Rh, K, Ba, Li, and Na.

* * * * *